United States Patent
Koval et al.

(10) Patent No.: US 6,737,156 B2
(45) Date of Patent: May 18, 2004

(54) INTERIOR WALLBOARD AND METHOD OF MAKING SAME

(75) Inventors: Francis J. Koval, Saint Simons Island, GA (US); David J. Neal, Saint Simons Island, GA (US); Richard Silversides, Saint Simons Island, GA (US); Joseph Riccio, Jr., Brunswick, GA (US); Charles J. Raymond, Atlanta, GA (US); Felmer F. Cummins, Kennesaw, GA (US)

(73) Assignee: GP Gypsum Corp., Atlanta, GA (US)

( * ) Notice: Subject to any disclaimer, the term of this patent is extended or adjusted under 35 U.S.C. 154(b) by 0 days.

(21) Appl. No.: 10/245,505

(22) Filed: Sep. 18, 2002

(65) Prior Publication Data

US 2003/0211305 A1 Nov. 13, 2003

Related U.S. Application Data

(60) Provisional application No. 60/378,411, filed on May 8, 2002.

(51) Int. Cl.[7] .............................................. B32B 17/12
(52) U.S. Cl. ............................. 428/294.7; 428/314.2; 428/300.1; 428/348; 428/369; 428/375; 428/403; 428/405; 156/202; 156/204; 156/216; 156/227; 156/231; 156/235; 156/242; 156/324
(58) Field of Search ................................ 428/213, 228, 428/251, 268, 285, 294.7, 300.1, 318, 369, 375, 391, 403, 405, 298.7, 309.9, 314.2, 351, 440; 156/160, 176, 196, 199, 200, 202, 204, 212, 216, 227, 231, 235, 242, 324

(56) References Cited

U.S. PATENT DOCUMENTS

| | | | | |
|---|---|---|---|---|
| 3,993,822 A | * | 11/1976 | Knauf et al. | 428/313 |
| 4,647,496 A | * | 3/1987 | Lehnert et al. | 428/251 |
| 4,810,569 A | * | 3/1989 | Lehnert et al. | |
| 4,879,173 A | | 11/1989 | Randall | |
| 5,148,645 A | * | 9/1992 | Lehnert et al. | |
| 5,319,900 A | | 6/1994 | Lehnert et al. | |
| 5,342,680 A | | 8/1994 | Randall | |
| 5,397,631 A | * | 3/1995 | Green et al. | |
| 5,644,880 A | * | 7/1997 | Lehnert et al. | |
| 5,704,179 A | | 1/1998 | Lehnert et al. | |

OTHER PUBLICATIONS

International Search Report for PCT/US03/01086, dated May 9, 2003.

* cited by examiner

*Primary Examiner*—Merrick Dixon
(74) *Attorney, Agent, or Firm*—Banner & Witcoff, Ltd.

(57) ABSTRACT

A gypsum wallboard may have a paper-covered first face with shaped regions formed along side portions near the wallboard edges, and a fibrous mat-covered second face. The fibrous mat material covering the second face extends around the wallboard edges and is overlapped by portions of the paper on the first face. The wallboard can be manufactured by depositing a gypsum slurry onto a moving web of the fibrous mat material, applying a web of the paper to the deposited gypsum slurry, and forming shaped regions in the side portions of the top surface.

35 Claims, 7 Drawing Sheets

(not to scale)

(not to scale)

(not to scale)

(not to scale)

(not to scale)

(not to scale)

(not to scale)

(not to scale)

INTERIOR WALLBOARD AND METHOD OF MAKING SAME

CROSS-REFERENCE TO RELATED APPLICATIONS

This application claims the benefit of U.S. Provisional Application Ser. No. 60/378,411, filed May 8, 2002, titled "Interior Wallboard and Method of Making Same," hereby incorporated herein by reference.

FIELD OF THE INVENTION

This invention relates to an improved gypsum wallboard faced with fiber mat. More particularly, the present invention relates to a gypsum wallboard covered with a glass fiber mat (preferably a coated glass mat) on one face, and paper on the opposite face. The wallboard of the present invention is particularly advantageous for use in applications where a face of the wallboard will confront a confined area in which mold propagation may be a concern, such as, e.g., certain interior wall cavities. Still other applications will become apparent from the detailed description of the invention.

BACKGROUND OF THE INVENTION

Panels of gypsum wallboard having a core of set gypsum sandwiched between two sheets of facing paper have long been used as structural members in the fabrication of buildings. Such panels are typically used to form the partitions or walls of rooms, elevator shafts, stairwells, ceilings and the like. Although paper is a relatively inexpensive facing material and easily used in the process of manufacturing wallboard, it is has disadvantages, particularly with regard to moisture-resistance. Moisture can have deleterious effects upon wallboard. In addition to degrading strength and other structural properties, moisture (in combination with other factors) can encourage the growth of fungi (including, e.g., mold). The problem can (under certain circumstances) be particularly acute with regard to certain spaces that, upon installation of the wallboard, are enclosed and inaccessible.

An example of this problem can occur with regard to interior walls. As is known in the art, interior walls are often formed by erecting a supporting structure (which may include wood or metal studs), and then fastening gypsum wallboard to that structure from floor to ceiling. A confined cavity is thereby formed within the wall. That cavity may be empty, or it may contain insulation, wiring, piping, etc. Once the wall is completed, however, that cavity is generally inaccessible without removing the wallboard, which must then be replaced. Even though inaccessible, a wall cavity is often susceptible to moisture penetration and collection. This may occur through leakage of pipes within the cavity, by condensation, by leaking of a roof, flooding, etc. If the wallboard is not resistant to water penetration, the facing and gypsum core may absorb water. Because wall cavities are typically not ventilated, the water may tend to remain, and fungal growth can occur.

As an alternative to paper facing, gypsum wallboard can also be manufactured with a fibrous mat (such as glass fiber) as a facing material. Examples of such wallboards include that described in, e.g., U.S. Pat. No. 3,993,822. In addition to improved water a resistance, fibrous matting often provides significant improvements in strength and other structural attributes. Although fibrous matting is a more advantageous facing material than paper in many respects, it may be less desirable than paper in other respects. For example, fibrous mat can be more expensive than paper. Glass or other fiber matting also provides a less desirable wall surface in some applications. Interior walls, for example, are often finished with paint or wall paper. Paper facing offers a smoother surface for painting or wall papering than is offered by fibrous mat facing.

It is also known in the art to manufacture gypsum wallboards for interior use having shaped regions near the edges. This shaped region can form a bevel, a taper, a rounded edge, or other desired shape. This shaping is often formed on the interior face (i.e., the face exposed to a room interior after installation). A cross section of such an existing wallboard is shown in FIG. 1A; various angles, thicknesses and other dimensions are exaggerated for clarity. Typically, the wallboard has a first face covered with a smooth paper facing material wrapped around the gypsum core. A second face is likewise covered with a paper facing material overlaying the gypsum core. The facing material from the first face is typically wrapped around the edges of the board and is overlapped at its margins by small portions of the facing material on the second face. The shaped regions can allow a small depression to be formed along the joints of adjoining wallboards. Specifically, the first faces of adjoining wallboards are oriented so as to confront the interior of a room, with their edges touching (or very close together). Joint tape, drywall mud, etc. can be placed into the depression to provide a finished wall that is generally flat (e.g., without ridges along the wallboard joints) and ready for painting or wallpapering. FIG. 1A also shows, on the left hand side of the figure, additional examples of shapes that may be formed.

Although interior wallboards with shaped regions on an interior face are used in applications which might benefit from the advantages of both fiber matting and paper facing materials, combining such materials in a single board for such an application presents potential problems, and has not been described in the prior art. Because dissimilar facing materials would generally create different stresses during fabrication of the wallboard, warpage would be expected to occur. Moreover, conventional manufacturing methods require that the shaped regions be formed on the bottom surface of a horizontal wallboard as it progresses down a production line during fabrication. FIG. 1B is a schematic cross section of a prior art wallboard during manufacture. The center would typically be horizontal, with two small shaping forms attached to, and running the length of, the conveyor. The upper surface of the forming wallboard would typically be flat. This arrangement, however, requires that the facing material on the bottom (conveyor) side be used to wrap around the edges of the wallboard during fabrication. In order to manufacture an interior wallboard using conventional methods, and having shaped regions on the paper-covered face and a mat-covering on the other face, it would be necessary to place the paper web on the bottom (conveyor) surface and the mat web on the top surface. However, the paper web would then be wrapped around the edges of the fabricated wallboard. In this configuration, and upon installation of a wallboard in a wall, the paper facing material would be exposed to the confined interior wall cavity. As set forth above, paper can be less water-resistant than fibrous matting. Moreover, the joints between adjacent wallboards are generally not sealed on the wall cavity side. A paper-wrapped edge could thus provide a path for moisture to infiltrate the wallboard, and at least partially defeat the benefits of the mat facing material.

SUMMARY OF THE INVENTION

According to the present invention, a gypsum wallboard has a paper-covered first face with shaped regions near the edges, and a second face covered with a water-resistant facing material, preferably a fibrous mat material, and more preferably a coated fibrous mat material. The paper-covered first face presents a good surface for painting or wallpapering. The second face, because of its preferred coated mat facing material, is resistant to water infiltration. The mat material covering the second face wraps around the edges of the wallboard. Preferably, the mat material terminates on the shaped regions of the first face. The paper facing material is glued to the mat along an overlap of the two facing materials, preferably on the shaped regions of the first face.

According to another aspect of the invention, a process for fabricating a wallboard with shaped regions is provided. A bottom web of facing material is continuously fed. Onto the bottom web is deposited a gypsum slurry. Lateral portions of the bottom web are wrapped around the edge of the forming wallboard and overlap side portions of the upper slurry surface along its margins. A top web of continuously fed facing material is applied to the upper surface of the slurry, and is glued along regions of overlap of the two facing materials A series of shims located along the lateral margins of the upper surface of the forming wallboard form shaped regions in those margins. In this manner, it is thereby possible to continuously form wallboard having shaped regions in a first face, with the facing material of a second face extending around the wallboard edges.

BRIEF DESCRIPTION OF THE DRAWINGS

The objects, features, and advantages of the invention will be apparent from the following more detailed description of certain embodiments of the invention and as illustrated in the accompanying drawings in which reference characters refer to the same parts throughout the various views. The drawings are not to scale, emphasis instead being placed upon illustrating the features of the invention.

DETAILED DESCRIPTION OF THE INVENTION

Figure 1A:
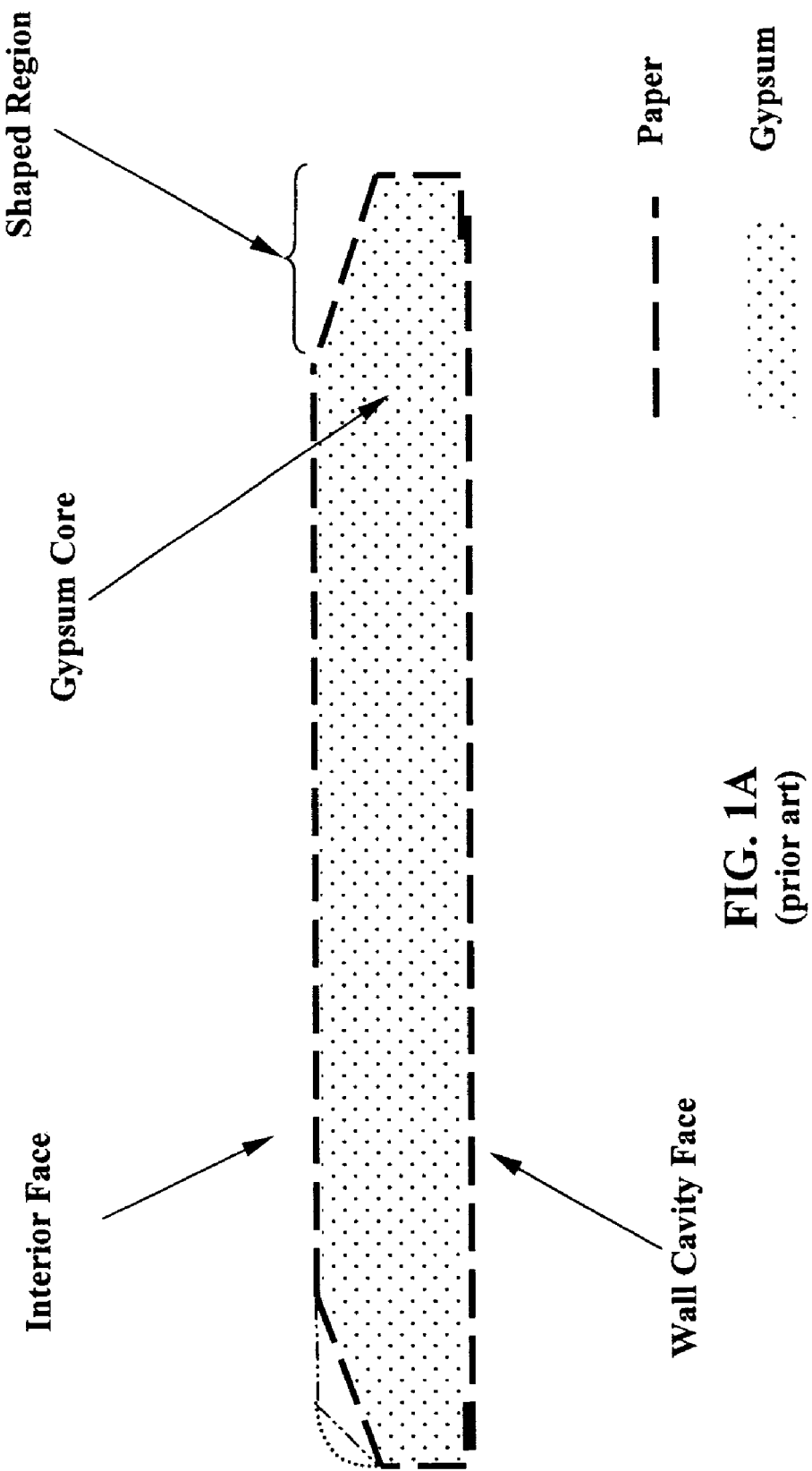
FIG. 1A is a schematic cross section of a conventional gypsum wallboard with shaped regions on one face.
Figure 1B:
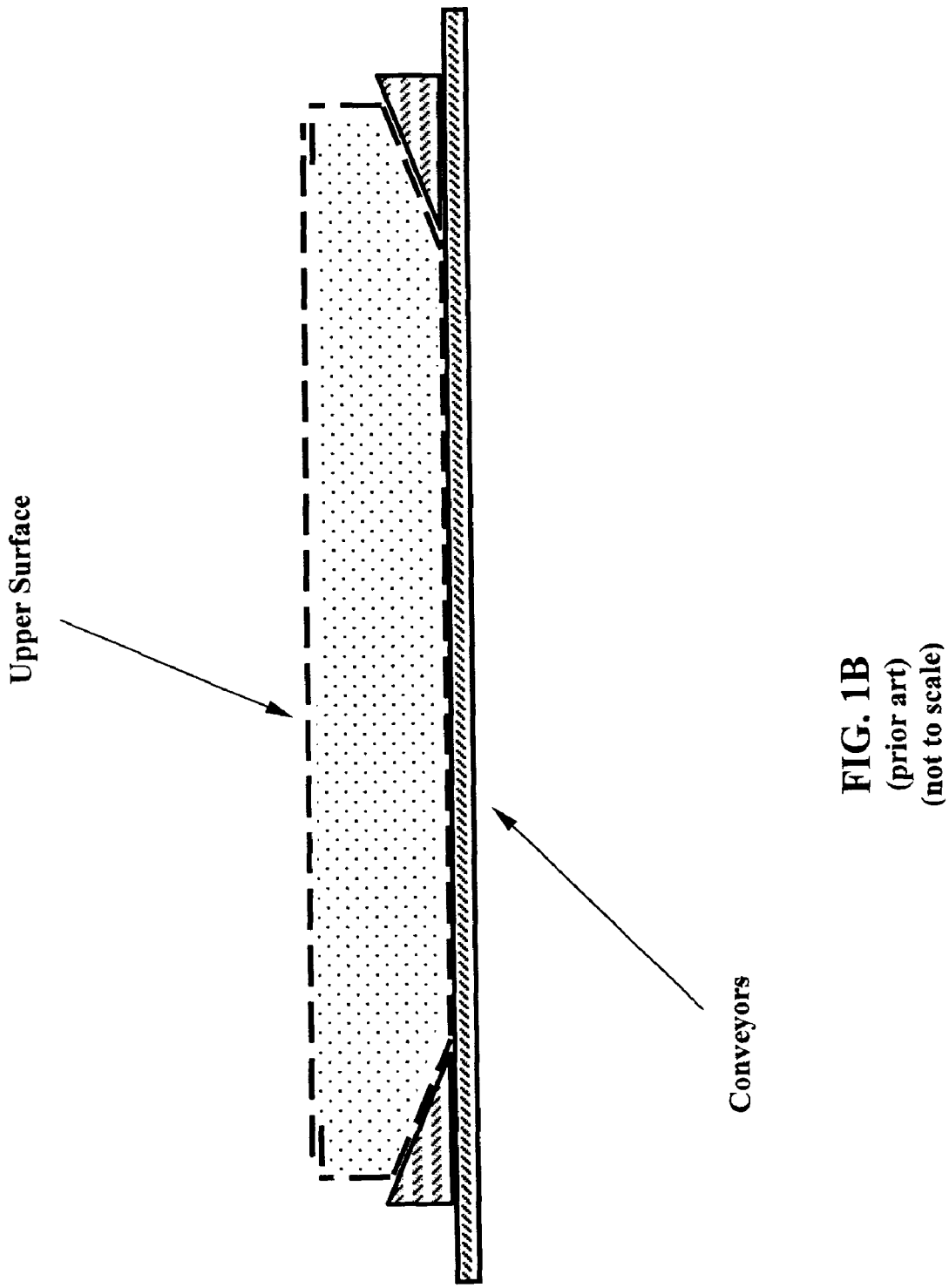
FIG. 1B is a schematic cross section of an existing manner of producing wallboard with shaped regions on one face.
Figure 2:
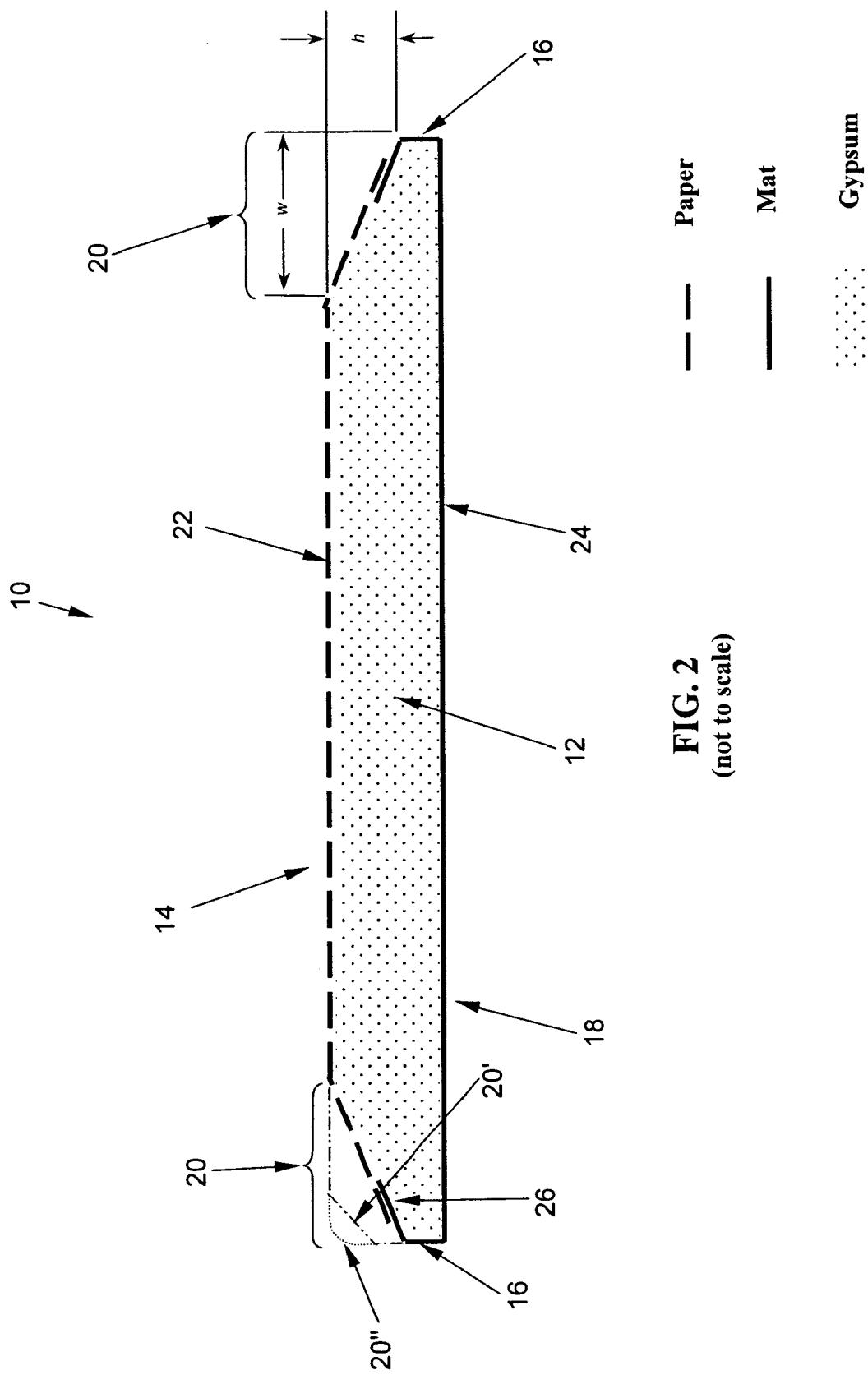
FIG. 2 is a schematic cross section of a wallboard according to the present invention.
Figure 3:
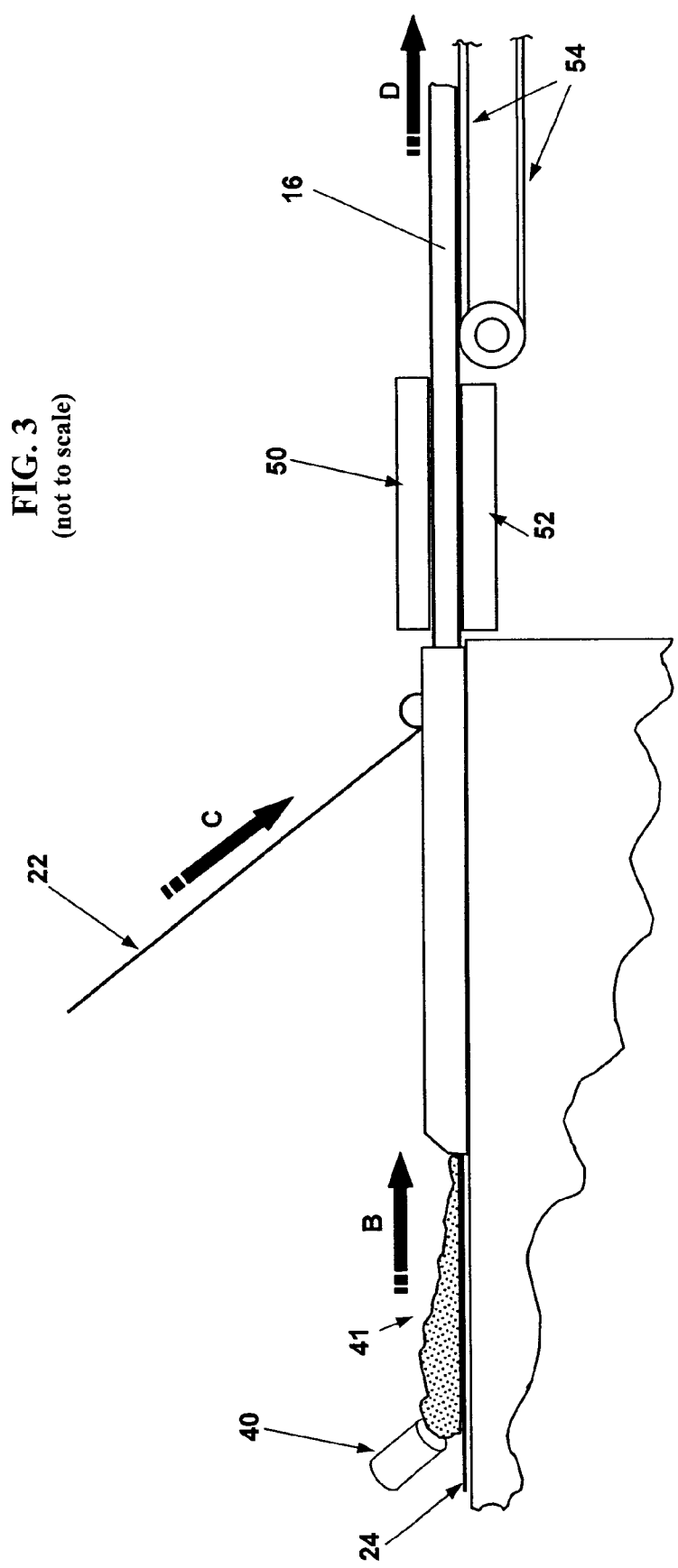
FIG. 3 is a partial schematic view of a portion of a wallboard production line.

FIG. 2 is a cross section of a wallboard 10 according to the present invention. FIG. 2 is not to scale; various angles, thicknesses and other dimensions are exaggerated for clarity and purposes of illustrating the invention. Wallboard 10 has a gypsum board core 12. Wall board 10 has a first face 14, two edges 16, and a second face 18. First face 14 further has shaped regions 20 formed along marginal side portions of first face 14 adjacent to edges 16. Although wallboard 10 is shown with tapers, alternate shapes include bevels (20'), rounded edges (20") and other shapes (not shown), all of which are within the scope of the invention. First face 14 is covered over all (or substantially all) of its surface area with paper 22. Second face 18 is covered with fibrous mat material 24. As described below, the mat material 24 is preferably a coated fibrous mat, with the coating on the surface of the mat opposite the gypsum core. Mat material 24 further wraps around edges 16 onto portions of first face 14, preferably onto shaped regions 20. In FIG. 3, mat material 24 is overlapped by paper 22 and is affixed to paper 22 with glue in the overlap 26. Wallboard 10 can have varying thickness and widths as desired, as is well known. For a ½ inch nominal thickness wallboard, an exemplary taper may have a width w of approximately 2.5 inches and a height h of approximately 0.075 inches. Other dimensions for a taper, for a bevel, or for other shapes are within the scope of the invention, and are known to persons skilled in the art (or would be known in light of the disclosures herein). The shaped region will generally (but need not necessarily) be the same on both sides of a wallboard. Similarly, a particular shape (e.g., taper, bevel or round) may (but need not) have the same dimensions on wallboards of different thickness. As set forth below, the facing materials will be in contact with and integrally adhered to the gypsum core.

The gypsum core 12 of wallboard 10 of the present invention is basically of the type used in gypsum structural products commonly known as gypsum wallboard, dry wall, gypsum board, gypsum lath and gypsum sheathing. The core of such a product is formed by mixing water with powdered anhydrous calcium sulfate or calcium sulfate hemi-hydrate ($CaSO_4.\frac{1}{2}H_2O$), also known as calcined gypsum to form an aqueous gypsum slurry, and thereafter allowing the slurry mixture to hydrate or set into calcium sulfate dihydrate ($CaSO_4.2H_2O$), a relatively hard material. The core of the product will in general comprise at least about 85 wt. percent of set gypsum, though the invention is not limited to any particular content of gypsum in the core.

The composition from which the set gypsum core of the structural panel is made can include a variety of optional additives, including, for example, those included conventionally in gypsum wallboard. Examples of such additives include set accelerators, set retarders, foaming agents, reinforcing fibers, and dispersing agents. Fungicides can be added, if deemed desirable. Starch is often added, but may be omitted according to the present invention. To improve the water-resistant properties of the core, the gypsum composition from which the core is made may also include one or more additives to improve the ability of the set gypsum composition to resist being degraded by water (for example, to resist dissolution). In one embodiment, the water-resistance of the wallboard is such that it absorbs less than about 10%, preferably less than about 7.5%, and most preferably less than about 5% water when tested in accordance with the immersion test of ASTM method C-473.

Typically, wallboards for interior use contain wax or a wax emulsion as an additive to improve the water resistance of the gypsum core. The invention is not limited thereby, however, and examples of other materials which have been reported as being effective for improving the water-resistant properties of gypsum products include the following: poly (vinyl alcohol), with or without a minor amount of poly (vinyl acetate); metallic resinates; wax or asphalt or mixtures thereof, usually supplied as an emulsion; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogenpolysiloxanes; siliconates, such as available from Dow Corning as Dow Corning 772; a wax emulsion and a wax-asphalt emulsion each with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product. Mixtures of these additives can also be employed.

Species of wax emulsions and wax-asphalt emulsions used to improve wallboard water resistance are commercially available. The wax portion of these emulsions is preferably a paraffin or microcrystalline wax, but other waxes also can be used. If asphalt is used, it in general should have a softening point of about 115° F., as determined by the ring and ball method. The total amount of wax and wax-asphalt in the aqueous emulsions will generally comprise about 50 to about 60 wt. percent of the aqueous emulsion. In the case of wax-asphalt emulsions, the weight ratio of asphalt to wax usually varies from about 1 to 1 to about 10 to 1. Various methods are known for preparing wax-asphalt emulsions, as reported in U.S. Pat. No. 3,935,021. Commercially available wax emulsions and wax-asphalt emulsions that can be used in the gypsum composition described herein have been sold by United States Gypsum Co. (Wax Emulsion), by Monsey Products (No. 52 Emulsion), by Douglas Oil Co. (Docal No. 1034), by Conoco (No. 7131 and Gypseal II) and by Monsey-Bakor (Aqualite 70). The amount of wax emulsion or wax-asphalt emulsion used to provide water resistant characteristics to the gypsum core often can be within the range of about 3 to about 10 wt. %, preferably about 5 to about 7 wt. %, based on the total weight of the ingredients of the composition from which the set gypsum core is made, the ingredients including the water of the wax or wax-asphalt emulsion, but not including additional amounts of water that are added to the gypsum composition for forming an aqueous slurry thereof.

A mixture of materials, namely, one or more of poly(vinyl alcohol), siliconates, wax emulsion and wax-asphalt emulsion of the aforementioned types, for example, can be used to improve the water resistance of gypsum products, such as described in aforementioned U.S. Pat. No. 3,935,021. The source of the poly(vinyl alcohol) is preferably a substantially completely hydrolyzed form of poly(vinyl acetate), that is, about 97 to 100% hydrolyzed polyvinyl acetate. The poly (vinyl alcohol) should be cold-water insoluble and soluble in water at elevated temperatures, for example, at temperatures of about 140° to about 205° F. In general, a 4 wt. % water solution of poly(vinyl alcohol) at 20° C. will have a viscosity of about 25 to 70 cp as determined by means of the Hoeppler falling ball method. Poly(vinyl alcohols) for use in the gypsum core have been available commercially, such as from E.I. du Pont de Nemours and Company, sold under the trademark "Elvanol" and previously from Monsanto Co., sold under the trademark "Gelvatol". Examples of such prior-available products are Elvanol, Grades 71-30, 72-60, and 70-05, and Gelvatol, Grades 1-90, 3-91, 1-60, and 3-60. Air Products Corp. also has sold a product identified as WS-42. There are many additional commercial sources of poly(vinyl alcohol).

When used, the amounts of poly(vinyl alcohol) and wax-asphalt emulsion or wax emulsion used should be at least about 0.05 wt. % and about 2 wt. % respectively. The preferred amounts of poly(vinyl alcohol) and wax or wax-asphalt emulsion are about 0.15 to about 0.4 wt. % and about 3 to about 5 wt. %, respectively. The siliconates are normally used in an amount of from about 0.05% to about 0.4%, more usually in an amount of about 0.1%. Unless stated otherwise, the term "wt. %" when used herein and in the claims in connection with the gypsum core means weight percent based on the total weight of the ingredients of the composition from which the set gypsum core is made, said ingredients including the water of the wax or wax-asphalt emulsion, but not including additional amounts of water that are added to the gypsum composition for forming an aqueous slurry thereof.

Another water-resistant additive for use in the core of the gypsum-based core is an organopolysiloxane, for example, of the type referred to in U.S. Pat. Nos. 3,455,710; 3,623,895; 4,136,687; 4,447,498; and 4,643,771. Within this class of materials, poly(methyl-hydrogen-siloxane) is particularly preferred. When used, the amount of the organopolysiloxane should be at least about 0.2 wt. %. In one embodiment, a preferred amount falls within the range of about 0.3 to about 0.6 wt %. As noted above, the use of any particular water-resistant additive is optional.

Typically, the core of fibrous mat-faced gypsum board has a density of about 40 to about 55 lbs. per cu. ft., more usually about 46 to about 50 lbs per cu. ft. Of course, cores having both higher and lower densities can be used in particular applications if desired. The manufacture of cores of predetermined densities can be accomplished by using known techniques, for example, by introducing an appropriate amount of foam (soap) into the aqueous gypsum slurry from which the core is formed or by molding.

In accordance with the present invention, and as illustrated in FIG. 2, one surface of the core 12 of the gypsum board 10 is faced with a fibrous mat 24. The fibrous mat may be (and preferably is) coated to make it resistant to moisture and (preferably) essentially impervious to liquid water. Such a coating should be sufficiently porous, however, to permit water in the aqueous gypsum slurry from which the gypsum core is made to evaporate in its vaporous state therethrough during manufacture of the board. The coated mat can be prepared in advance and used in fabricating board; may be coated after fabrication of the board; or may be coated before and after fabrication. Non-exclusive examples of possible coatings are described in U.S. Pat. No. 5,112,678 and U.S. patent application Ser. No. 09/837,226, entitled "Mat-Faced Gypsum Board," both of which are incorporated herein by reference. As described in more detail below, wallboard can be efficiently made by forming an aqueous gypsum slurry which contains excess water and placing the gypsum slurry onto a horizontally oriented moving web of coated or uncoated fibrous mat. Another horizontally oriented moving web of paper is then placed on the upper free surface of the aqueous gypsum slurry. Following initial hydration and ultimately aided by heating, excess water evaporates through the mat and paper as the calcined gypsum hydrates and sets.

The fibrous mat comprises material that is capable of forming a strong bond with the set gypsum comprising the core of the gypsum board. Examples of such materials include (1) a mineral-type material such as glass fibers, (2) synthetic resin fibers and (3) mixtures of such fibers. Glass fiber mats are preferred, especially those that are pre-coated before board manufacture. The mat can comprise continuous or discrete strands or fibers and can be woven or nonwoven in form. Nonwoven mats such as made from chopped strands and continuous strands can be used satisfactorily and are less costly than woven materials. The strands of such mats typically are bonded together to form a unitary structure by a suitable adhesive. The fiber mat can range in thickness, for example, from about 10 to about 40 mils, with a mat thickness of about 15 to about 35 mils generally being suitable. The aforementioned fibrous mats are known and are commercially available in many forms.

One suitable fibrous mat is a fiberglass mat comprising chopped, nonwoven, fiberglass filaments oriented in a random pattern and bound together with a resin binder, typically a urea-formaldehyde resin adhesive. Fiber glass mats of this type are commercially available, for example, such as those which have been sold under the trademark DURA-GLASS by Manville Building Materials Corporation and those which have been sold by Elk Corporation as BUR or shingle mat. An example of such a mat, which is useful in preparing a coated mat for making gypsum board useful in structural building applications, is nominally 33 mils thick and incorporates glass fibers about 13 to 16 microns in diameter. Although certain structural applications may utilize a thicker mat and thicker fibers, a glass fiber mat nominally 20 mils thick, which includes glass fibers about 10 microns in diameter, is also suitable for use in the present invention. Mats suitable for use in the present invention have a basis weight which is usually between about 10 and 30 lbs. per thousand square feet of mat surface area Typically, but not exclusively, the glass fiber mats used in this invention are wet-formed into a continuous non-woven web of any workable width on a Fourdrinier-type machine. Preferably, an upwardly inclining wire having several linear feet of very dilute stock lay-down, followed by several linear feet of high vacuum water removal, is used. This is followed by a "curtain coater," which applies the glass fiber binder and an oven that removes excess water and cures the adhesive to form a coherent mat structure.

Preferably the fibrous mat used in accordance with the present invention, is a coated glass fiber mat, preferably a coated mat wherein the outer surface of the mat is coated with a coating that comprises a mixture of predominately a mineral pigment (pigmented filler material), an inorganic binder and a latex polymer binder. In particular, the preferred coating comprises a dried (or cured) aqueous mixture of a mineral pigment; a first binder of a polymer latex adhesive and, a second binder of an inorganic adhesive. On a dry weight basis, the first polymer latex binder generally comprises no more than about 5.0% by weight of the coating, and the second inorganic binder generally comprises at least about 0.5% by weight, of the total weight of the dried (cured) coating.

A suitable mineral pigment comprises the major component of the preferred coating composition. Examples of mineral pigments suitable for making the preferred coated mats include, but are not limited to, ground limestone (calcium carbonate), clay, sand, mica, talc, gypsum (calcium sulfate dihydrate), aluminum trihydrate (ATH), antimony oxide, or a combination of any two or more of these substances. The mineral pigment is usually provided in a particulate form. To be an effective mineral pigment for making a coated mat for use in this invention, the pigment should have a particle size such that at least about 95% of the pigment particles pass through a 325 mesh wire screen. Such materials are collectively and individually referred to in the alternative as mineral pigments or as "fillers."

The second binder preferably comprises an inorganic compound such as calcium oxide, calcium silicate, calcium sulfate, magnesium oxychloride, magnesium oxysulfate, or aluminum hydroxide. In an alternative embodiment, the second binder is included as an inherent component in the mineral pigment component, as in the case wherein the mineral pigment includes aluminum trihydrate, calcium carbonate, calcium sulfate, magnesium oxide, or some clays and sands.

One example of a complex inorganic binder is common Portland cement, which is a mixture of various calcium-aluminum silicates. However, Portland cement cures by hydration, which can create a coating mixture with a short shelf life. Also, both the oxychloride and the oxysulfate of magnesium are complex inorganic binders, which cure by hydration. Coating formulations made with such inorganic adhesive binders must be used quickly or a tank containing the aqueous coating composition could set up in a short period of time.

The oxychlorides or oxysulfates of magnesium, aluminum hydroxide, and calcium silicate are only very slightly soluble in water, and are useful inorganic adhesive binders of this invention. Inorganic adhesive binders, which are quickly soluble in water, such as sodium silicate, may not be usable in coatings expected to be exposed to hot and/or high humid ambient conditions for long periods. One preferred inorganic adhesive binder for making a suitable coated mat is quicklime (CaO). Quicklime does not hydrate in a coating mix, but cures by slowly converting to limestone, using carbon dioxide from the air. Quicklime is not soluble in water.

Filler materials inherently containing some naturally occurring inorganic adhesive binder can be used to make the preferred coated mat. Examples of such fillers, some listed with the naturally occurring binder, include (but are not limited to) the following: limestone containing quicklime (CaO), clay containing calcium silicate, sand containing calcium silicate, aluminum trihydrate containing aluminum hydroxide, cementitious fly ash and magnesium oxide containing either the sulfate or chloride of magnesium, or both. Depending on its level of hydration, gypsum can be both a mineral pigment and an inorganic adhesive binder, but it is only slightly soluble in water, and the solid form is crystalline making it brittle and weak as a binder. As a result, gypsum is not generally preferred for use as the inorganic adhesive binder.

Fillers, which inherently include an inorganic adhesive binder as a constituent and which cure by hydration, also advantageously act as flame suppressants. As examples, aluminum trihydrate (ATH), calcium sulfate (gypsum), and the oxychloride and oxysulfate of magnesium all carry molecules of water bound into their molecular structure. This water, referred to either as water of crystallization or water of hydration, is released upon sufficient heating, actually suppressing flames.

Low cost inorganic mineral pigments such with the properties of those described in the preceding paragraph, thus, provide three (3) important contributions to the coating mixture: a filler; a binder; and, a fire suppressor.

Examples of polymer latex binders used with the inorganic binders include, but are not limited to: styrene-butadiene-rubber (SBR), styrene-butadiene-styrene (SBS), ethylene-vinyl-chloride (EVCl), poly-vinylidene-chloride (PVdC), modified poly-vinyl-chloride (PVC), poly-vinyl-alcohol (PVOH), ethylene-vinyl-acetate (EVA), and poly-vinyl-acetate (PVA). Asphalt is not generally used as a binder in making a coated mat useful in this invention.

The ratio, by weight, of the mineral pigment to the polymer latex adhesive in the preferred coating is generally in excess of 15:1 and in some cases can be in excess of 20:1.

Suitable coating compositions for making coated mat useful in the present invention thus may contain, on a dry weight basis, about 75 to 98 percent mineral pigment, more usually about 85 to 95 percent mineral pigment, about 0.5 to 20 percent inorganic adhesive, more usually about 0.5 to 10 percent and about 0.1 to 5 percent polymer latex adhesive, more usually about 1 to 5 percent.

In order for the coated mat to be most useful in making the coated mat-faced gypsum board, it is preferred that the coated mat be flexible enough to be rolled up into rolls of continuous sheet. As a result, the coated mat should not be so stiff and brittle that it will break upon bending. To accomplish this objective, it appears that the inorganic adhesive binder content of the mat coating generally should not exceed about 20% by weight of the total dry weight of the coating, and usually is less than 10%. Likewise, the polymer latex binder has practical upper limits due to cost and a desire to limit the combustibility of the coating. No more than about 5.0% latex (dry weight basis) of the total dry weight of the coating appears necessary. Rolls of a coated glass fiber mat suitable for making the coated mat faced gypsum board of the present invention have been obtained from Atlas Roofing Corporation as Coated Glass Facer (CGF).

Any suitable method for applying an aqueous coating composition to a substrate can be used for making the coated mat. The coating composition can be applied by any suitable means to the fibrous mat, for example, spray, brush, curtain coating, and roller coating, the last mentioned being preferred.

The amount of coating applied to the surface of the fibrous mat should be sufficient to embed the surface of the mat completely in the coating, to the extent that substantially no fibers protrude through the coating. The amount of coating required is dependent upon the thickness of the mat. It is difficult to measure thickness of the coating because of the uneven nature of the fibrous mat substrate on which the coating is applied. In rough terms, the thickness of the coating should be at least about 10 mils, but when the glass mat is relatively thin and the coating is efficiently dried, a coating as thin as 4 mils may suffice. In general, the thickness need not exceed about 30 mils.

A coated glass fiber mat for use in this invention can be prepared by applying an aqueous coating composition containing the noted solid constituents to a fiber mat in an amount on a dry weight basis equivalent to at least about 50 lbs., more usually between about 60 and 120 lbs., per 1000 sq. ft. of mat. Normally, the dry coating is present in an amount equivalent to at least about 60 lbs., most often between about 80 and 100 lbs., per 1000 sq. ft. of mat, depending upon the thickness of the glass fiber mat. Using a glass fiber mat nominally 33 mils thick (made using fibers of about 16 microns), the amount of coating when dried should be equivalent to at least about 50 lbs., preferably about 100 lbs. per 1000 sq. ft. of mat surface area; using a fiber glass mat nominally 20 mils thick (made with fibers of about 10 microns), a lesser amount of coating may be used. Although higher or lower amounts of coating can be used in any specific case, it is believed that, for most applications, the amount of coating will fall within the range of about 50 to about 120 lbs per 1000 sq. ft. of mat (dry basis). In particularly preferred form, applied to 33 mil mat, the dry coating should weigh about 60 to about 80 or 100 lbs. per 1000 sq. ft. of board; applied to 20 mil mat, the dry coating may weigh about 80 lbs. per 1000 sq. ft.

Following application of the aqueous coating composition to the mat the composition is dried (cured), usually by heat to form the coated mat. The coated mat made in accordance with these teachings is liquid impermeable, but does allow water vapor to pass through.

In other embodiments of the invention, the fibrous mat can be provided with a water-resistant coating of the type described in U.S. Pat. No. 5,397,631, either in lieu of, or in addition to the above-described coating. The disclosure of U.S. Pat. No. 5,397,631 is incorporated herein by reference. This coating can be applied onto the surface of the uncoated, or coated fibrous mat, either before of after it is bonded to the set gypsum core, as an aqueous coating composition comprising from about 15 to about 35 wt. % of resin solids, about 20 to about 65 wt. % of filler, and about 15 to about 45 wt. % of water. One resin suitable for use in the coating composition is available in the form of a latex, as previously sold by Unocal Chemicals Division of Unocal Corporation under the mark 76 RES 1018. The pH and solids content of the latex are respectively 7.5–9.0 and 50%. The resin is a styrene-acrylic copolymer that has a relatively low film-forming temperature (20° C.) and a glass transition temperature, Tg of 22° C. Coatings formed from the resin can be dried effectively at temperatures within the ranges of about 300 to 400° F. (150 to 205° C.). Another suitable resin for the coating is a poly(vinylidene) copolymer. Still another reinforcing resin binder suitable for use in this embodiment of the present invention also has been available in the form of a latex sold by Unocal Chemicals Division of Unocal Corporation—under the mark 76 RES 2302. The pH and solids content of the latex are, respectively, 3.5 and 45%. The resin is a self-crosslinking vinyl acetate-acrylic copolymer that has a Tg of about 33° C. Other suitable resins will be apparent to those skilled in the art. Examples of fillers that can be used in making the aqueous coating composition are silicates, silica, gypsum and calcium carbonate, the last mentioned being particularly preferred. Other conventional additives of the type generally used in latex paint compositions also can be added to this coating composition. In general, the total amount of such additives will be within the range of about 1 to about 5 wt. %. Examples of such additives include pigments, thickeners, defoamers, dispersants and preservatives.

Still other compositions for coating the fibrous mat used in the present invention well be apparent to those skilled in the art, and the present invention is not limited to any particular coated mat.

Paper 16 is preferably of a type commonly used for the face sheet of wallboard products. Such paper products are well known to those skilled in the art. Preferably, paper 16 is an ivory paper having hard internal sizing (100% through) of 1000 to 3500; a basis weight of about 54 to 56 pounds per 1000 square feet; an overall caliper of about 0.013 inches; a tensile strength of about 70 lbs/inch (machine direction) and about 23 lbs/inch (cross direction); a top liner Cobb surface wetting of about 1.00 to about 1.50 grams and bottom liner Cobb surface wetting of about 0.50 to about 1.50 grams; and a porosity of about 15 sec. to about 150 sec.

FIG. 3 is a schematic drawing of a portion of a manufacturing line for producing gypsum wallboard according to the present invention. In conventional fashion, dry ingredients from which the gypsum core is formed are pre-mixed and then fed to a mixer of the type commonly referred to as a pin mixer (not shown). Water and other liquid constituents, such as soap, used in making the core are metered into the pin mixer where they are combined with the desired dry ingredients to form an aqueous gypsum slurry 41, which emerge from a discharge conduit 40 of the pin mixer. Foam (soap) is generally added to the slurry in the pin mixer to control the density of the resulting core. The slurry is deposited through one or more outlets of the discharge conduit 40 onto a horizontally moving continuous web of fibrous mat material 24 (preferably a precoated glass mat). The amount deposited can be controlled in manners known in the art. Mat material 24 is fed from a roll (not shown), and if coated, with the coated side down. Prior to receiving the gypsum slurry 41, the web of mat material 24 is flattened by rollers (not shown) and scored by one or more scoring devices (not shown). Scoring allows the sides of mat material 24 to be folded upward, as described below. Mat material 24 and the deposited gypsum slurry 41 move in the direction of arrow B. The moving web of mat 24 will form the second facing sheet of the wallboards being fabricated, and the slurry at least partially (and preferably, only partially) penetrates into the thickness of the mat and cures. On setting, a strong adherent bond is formed between the set gypsum and the mat. The partial penetration of the slurry into the mat can be controlled according to methods known in the art such as, for example, controlling the viscosity of the slurry and by applying various coatings to the mat material.

After the gypsum slurry 41 is deposited upon the web of mat material 24, the edges of that web are progressively folded (using equipment well-known to those skilled in the art) around the edges of the forming wallboard, and terminate on the upper surface of the slurry along the sides. A web of paper 22, fed in the direction of arrow C from a roll (not shown), is applied to the upper surface of the gypsum slurry 41, and usually only slightly overlaps the folded-around edges of the (bottom) web of mat material 24. Prior to applying the (top) web of paper 22 to the upper surface of the gypsum slurry, glue is applied to the paper web along portions of the paper that will overlap and be in contact with the folded-over mat edges (glue application is not shown). Although the invention is not limited by the type of glue used, preferably non-starch-based glues are used. One suitable glue is a poly(vinyl alcohol) latex glue. Glues based on vinyl acetate polymers, especially a vinyl acetate which has been hydrolyzed to form a polyvinyl alcohol, are widely available commercially as white glues. After the (top) web of paper 22 is applied, the "sandwich" of mat material web, gypsum slurry and paper material web are pressed to the desired wallboard thickness between plates 50 and 52. Alternatively, the webs and slurry can be pressed to the desired thickness with rollers or in another manner. The continuous sandwich of slurry and applied facing materials then is carried by conveyor(s) 54 in the direction of arrow D. Slurry 41 sets as it is carried along.

As described in the Background, conventional methods for interior wallboard production form a shaped region on the bottom surface of the forming wallboard as it moves down the production line. In another aspect of the present invention, and contrary to conventional practice, shaped regions are formed on the top surface of the forming wallboard. After passing through the plates 50, 52 (or other manner of forming the proper wallboard thickness), a series of inclined shims, rollers or other forming device(s) form the desired shaped region(s) along the marginal side portions of the upper surface of the setting wallboard.

Figure 4:
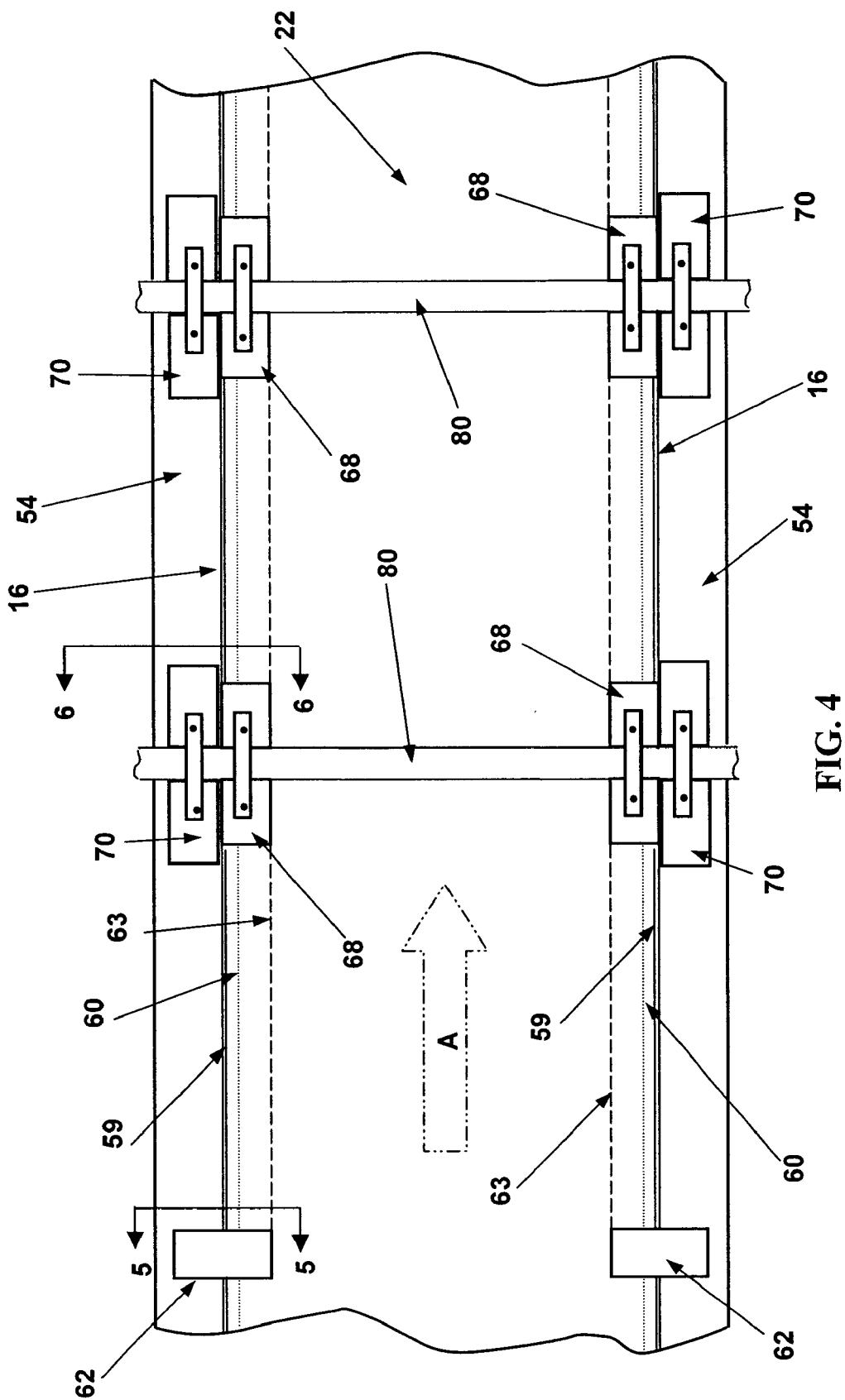
FIG. 4 is a partial schematic top view of another portion of the production line of FIG. 3.

FIG. 4, a schematic top view of another portion of the production line shown in FIG. 3, illustrates one arrangement for such shims. In particular, FIG. 4 shows a portion of the production line immediately downstream of plates 50 and 52. The lines 59 represent the edge of the paper 22 that has been placed on the upper surface. The dotted lines 60 represent the terminations of the edges of mat material 24 that have been wrapped-around the edges of the gypsum slurry and covered by paper 22. The large phantom arrow "A" indicates the direction of travel. A first set of shims 62 initially forms the shaped regions in the edges of the forming wallboard by pressing down into the upper surface. The dashed lines 63 indicate the boundary of the shaped region.

Figure 5:
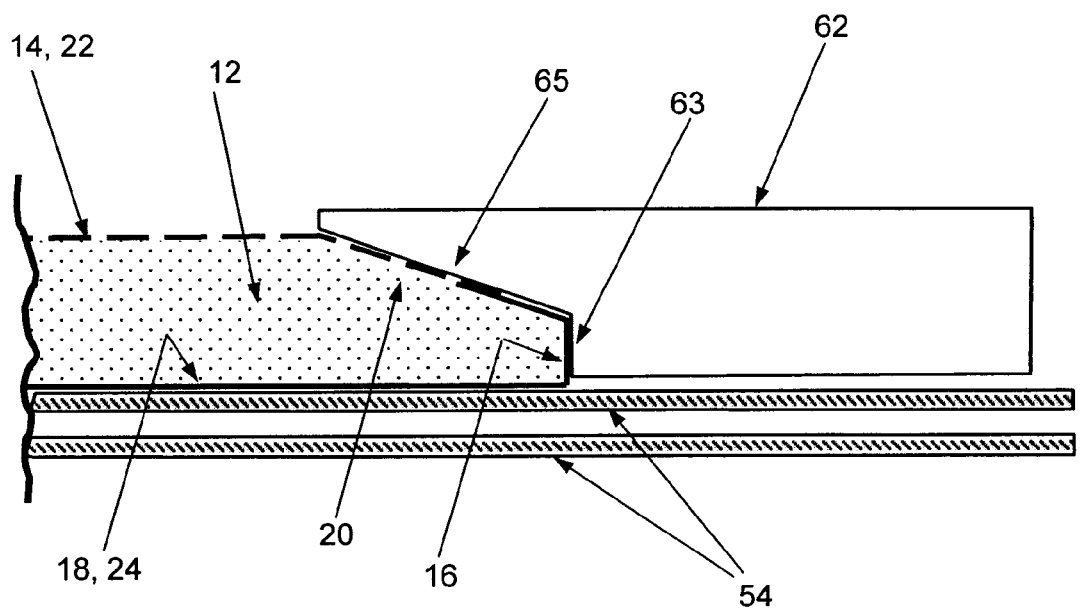
FIG. 5 is a partial schematic cross section along lines 5—5 of FIG. 4.

FIG. 5 shows, in cross section, one of the initial shims 62 forming a shaped region 20 on one side of the wallboard. Although FIG. 5 shows a shim that may be used to form a bevel or taper, persons skilled in the art will appreciate that other appropriate shapes (e.g., rounded or otherwise curved edges, differently dimensioned bevels or tapers, etc.) are also possible. Shim 62 is suspended above the moving conveyor 54. Shim 62 has an inclined portion 65 forming an angle with respect to the horizontal that corresponds to the desired shape. As the forming wallboard approaches shims 62, the gypsum slurry has not fully set and can still be shaped. As a marginal side portion of the upper surface of the forming wallboard passes under the overhanging and downwardly projecting portion 65 of a shim 62, the upper surface of the forming wallboard near the edge is conformed to the shim shape, to thereby produce the desired shape in the wallboard face. Shim 62 further has an edge shoe portion 63. Edge shoe portion 63 maintains the vertical edge 16 during formation of shaped region 20.

Subsequent shim pairs may be incorporated into existing structures on a production line, such as onto smoother bars. Smoother bars are typically located at various locations along the path on which the forming wallboard is conveyed, and serve to maintain a planar shape of the upper surface. As shown in FIG. 4, a second pair of shims 68 is attached to a first smoother bar 80, and serve to maintain the desired shape(s) in the sides of the forming wallboard. Also attached to smoother bar 80, outboard of shims 68, are a pair of edge shoes 70. Because of the nature and consistency of the slurry, it is generally not necessary to maintain constant downward pressure on the formed shape 20 in (or edges 16 of) the forming wallboard. Instead, a series of spaced-apart shims (or rollers or other comparable devices) and/or edge shoes along the edges serves to maintain the desired shape while the slurry fully sets. To the extent a shaped portion loses part of its desired shape between shim pairs, a succeeding shim "reminds" the forming wallboard and adjusts the shape as necessary.

Figure 6:
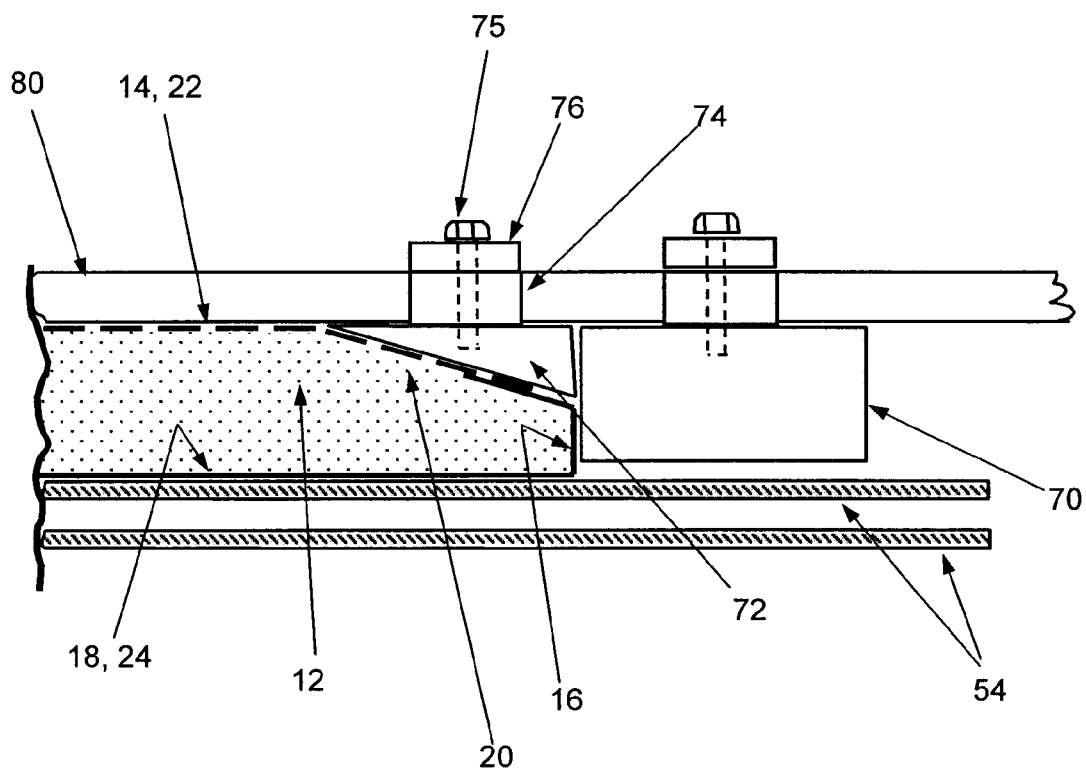
FIG. 6 is a partial schematic cross section along lines 6—6 of FIG. 4.

FIG. 6 shows, in cross section, one of the shims 68 from the second pair of shims. Shim 68 is attached to smoothing bar 80. Shim 68 includes an inclined portion 72 that generally corresponds to the shape of the shaped region 20 formed at shims 62. Inclined portion 72 has two connecting blocks 74, one of which (not shown) is on the upstream side of the connecting bar 80 to which the shim 68 is attached, and the other of which is on the downstream side of the connecting bar 80 to which the shim 68 is attached (shown). A cap piece 76 spans the two connecting blocks and is bolted to each connecting block by bolts 75 (only one of which is shown). Shim 68 need not be firmly "clamped" onto the smoother bar 80 by the cap piece 76. Shim 68 may be slidable along smoother bar 80, but held in place by a large O-ring, rubber band or other material (not shown) wrapped around cap piece 76 so as to increase the sliding friction between cap piece 76 and smoother bar 80. Edge shoe 70 is also attached to smoother bar 80 and suspended over the moving conveyor 54. Edge shoe 70 maintains the vertical edge 16 the setting wallboard.

In one embodiment, to form the exemplary taper shown in FIG. 2 having a width w of approximately 2.5 inches and a height h of approximately 0.075 inches, a pair of shims 68

(and edge shoes 70) is attached to each of six smoother bars, for a total of 7 shim pairs (including pair of initial shims 62). In that embodiment, the bottom surface of inclined portion 65 of each initial shim 62 in contact with the forming wallboard is approximately 2¼ inches wide and approximately 4 inches long. Similarly, the area of inclined portion 72 of each subsequent shim 68 in contact with the forming wallboard is approximately 2¼ inches wide and approximately 4⅜ inches long.

FIGS. 5 and 6 only illustrate one lateral side of the forming wallboard. However, it will be appreciated that the shims on the other lateral side of the forming wallboard are substantially similar, but with oppositely-oriented inclined or curved (or other shaped) portions. The particular design of the shims, as well as the number of shims and their placement, is exemplary only. It is only necessary that the shims generally correspond to the desired shape; that the shim surfaces in contact with the moving wallboard be sufficiently smooth to avoid snagging or otherwise marring the facing material; and that there be sufficient shim surface to maintain the desired shape while the slurry hardens. Other shim configurations are within the scope of the invention, and can be designed for incorporation into existing production lines. If for example, there are fewer (or no) smoother bars (such as smoother bars 80), alternative manners of attachment are within the scope of the invention. Such alternatives are within the abilities of a person skilled in the art once provided with the disclosures herein. As another alternative, a series of rollers could be utilized instead of (or in combination with) the shims. Other production process variables, such as line speed, etc. should not affected by the presence of the shims or rollers of the invention.

After being formed and sufficiently setting, the wallboard is typically cut to desired lengths and dried. Because the inside/exposed face of the wallboard (i.e., the face covered by paper 22) is on top during the forming process, the present invention provides the further advantage of not requiring that the wallboard be turned over before drying. In conventional production methods, the shaped interior face is the bottom surface of the board on the production line during the forming process. To prevent the quality of that surface from being degraded during drying, the board is turned over prior to drying. Because the present invention produces shaped regions on the top surface, this is no longer required.

Although not limited thereby, industrial drying conditions typically used in conventional continuous gypsum board manufacture also can be used in the manufacture of wallboard according to the present invention. Exemplary drying conditions include temperatures of about 200° to about 600° F., with drying times of about 30 to about 60 minutes, at line speeds of about 70 to about 600 linear feet per minute. After the initial preparation of the wallboard, separate water-resistant (or other) coatings can alternatively be applied to one, or both of the faces.

As set forth above, paper facing material and glass mat facing material typically generate different amounts of stress during formation, setting and drying of wallboard. Such asymmetric stresses would in turn be expected to cause warpage in a finished wallboard. Surprisingly, a wallboard prepared according to the present invention exhibits minimal warpage, and any warpage generated does not contribute to damage to the wallboard during automated processing.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. A gypsum wallboard comprising:
    a gypsum core having a planar first face, a planar second face, and at least two edges, the first face having shaped regions in side portions located on margins of the first face proximate to the edges, said shaped regions forming portions of depressions in the first face when the wallboard is placed in edgewise contact with a like wallboard;
    a paper facing material adhered to the first face; and
    a fibrous mat facing material adhered to and covering the second face, the edges and at least a portion of each shaped region.

2. The gypsum wallboard of claim 1, wherein the fibrous mat facing material is overlapped by the paper facing material.

3. The gypsum wallboard of claim 1, wherein the fibrous mat facing material overlaps the paper facing material.

4. The gypsum wallboard of claim 1, wherein the gypsum core includes a water-resistant additive in an amount sufficient to improve the water-resistant properties of the core.

5. The gypsum wallboard of claim 4, wherein the water-resistant additive comprises at least one of a wax emulsion, an organopolysiloxane and a siliconate.

6. The gypsum wallboard of claim 5, wherein the gypsum core is essentially void of starch.

7. The gypsum wallboard of claim 1, wherein the fibrous mat facing material comprises glass fibers, and wherein the fibrous mat facing material is coated to improve its water resistance.

8. The gypsum wallboard of claim 1, wherein the paper facing material comprises internally-sized paper.

9. The gypsum wallboard of claim 1, wherein the shaped regions comprise tapers.

10. The gypsum wallboard of claim 9, wherein lateral portions of the fibrous mat facing material terminate on the tapers.

11. The gypsum wallboard of claim 1, wherein the shaped regions comprise bevels.

12. The gypsum wallboard of claim 11, wherein lateral portions of the fibrous mat facing material terminate on the bevels.

13. The gypsum wallboard of claim 1, wherein the shaped regions comprise rounded edges.

14. The gypsum wallboard of claim 1, wherein:
    the gypsum core includes at least one of a wax emulsion, an organopolysiloxane and a siliconate in an amount sufficient to improve the water-resistant properties of the core;
    the gypsum core is essentially void of starch;
    the fibrous mat facing material comprises glass fibers and is coated to improve its water resistance;
    the paper facing material comprises internally-sized paper; and
    the fibrous mat facing material is glued to the paper facing material on overlaps of the two facing materials located in the shaped regions.

15. The gypsum wallboard of claim 14, wherein the gypsum core further comprises a fungicide.

16. The gypsum wallboard of claim 1 wherein the board exhibits minimal warpage.

17. A process for continuously manufacturing a gypsum wallboard, comprising:

forming a gypsum slurry;

continuously depositing the slurry onto a moving surface of a continuously fed bottom web of facing material, the bottom web having two lateral portions;

forming a substantially planar horizontal upper surface on the deposited slurry, the upper surface having two edges separating the upper surface from a substantially parallel lower surface in contact with the bottom web;

folding, as the slurry and bottom web advance, the lateral portions of the bottom web up and around the two edges so as to terminate on the upper surface;

applying a continuously fed top web onto the upper surface; and forming shaped regions in marginal side portions of the upper surface.

18. The process of claim 17, wherein the folding step occurs in advance of the applying step.

19. The process of claim 17, wherein the applying step occurs in advance of the folding step.

20. The process of claim 17 wherein the continuously depositing step comprises continuously depositing the slurry onto a moving surface of a continuously fed bottom web of fibrous mat material, and wherein the applying step comprises applying a continuously fed web of paper.

21. The process of claim 17 wherein the continuously depositing step comprises continuously depositing the slurry onto a moving surface of a continuously fed bottom web of fibrous mat material having glass fibers, and wherein the applying step comprises applying a continuously fed web of internally sized paper.

22. The process of claim 17, wherein forming shaped regions comprises forming tapers.

23. The process of claim 22, wherein folding comprises folding, as the slurry and bottom web advance, the lateral portions of the bottom web up and around the two edges so as to terminate on the tapers.

24. The process of claim 17, wherein forming shaped regions comprises forming bevels.

25. The process of claim 24, wherein folding comprises folding, as the slurry and bottom web advance, the lateral portions of the bottom web up and around the two edges so as to terminate on the bevels.

26. The process of claim 17, wherein forming shaped regions comprises forming rounded edges.

27. The process of claim 20, further comprising:

applying glue to portions of the top web that will be in contact with portions of the bottom web.

28. The process of claim 17, wherein the forming shaped regions comprises forming shapes along the marginal side portions of the upper surface with downwardly projecting shims located in the path of travel of the bottom web, deposited slurry and applied top web.

29. The process of claim 17, wherein forming a gypsum slurry further comprises:

adding a water-resistant additive in an amount sufficient to improve the water-resistant properties of a gypsum core of a finished wallboard.

30. The process of claim 17, wherein forming a gypsum slurry further comprises:

adding at least one of a wax emulsion, an organopolysiloxane and a siliconate in an amount sufficient to improve the water-resistant properties of a gypsum core of a finished wallboard.

31. The process of claim 29, wherein forming a gypsum slurry further comprises forming a gypsum slurry that is essentially void of starch.

32. The process of claim 31, wherein forming a gypsum slurry further comprises adding a fungicide.

33. The process of claim 21, further comprising:

applying glue to portions of the top web that will be in contact with portions of the bottom web; supporting the bottom web, deposited slurry and applied top web as they advance; and continuing to form the upper surface and shaped regions, and wherein:

forming a gypsum slurry further comprises
adding at least one of a wax emulsion, an organopolysiloxane and a siliconate in an amount sufficient to improve the water-resistant properties of a gypsum core of a finished wallboard,
adding a fungicide, and
forming a gypsum slurry that is essentially void of starch; and forming shaped regions comprises forming shaped regions in the marginal side portions of the upper surface with downwardly projecting shims located in the path of travel of the bottom web, deposited slurry and applied top web.

34. A gypsum wallboard comprising:

a gypsum core having a planar first face, a planar second face, and at least two edges, the first face having shaped regions formed in margins of the first face proximate to the edges;

a first facing material adhered to the first face; and a continuous second facing material adhered to and covering the second face, the edges and a portion of the first face.

35. A gypsum wallboard of claim 34 wherein the first facing material comprises paper and the second facing material comprises a different type of paper.

* * * * *